(12) United States Patent
Tang et al.

(10) Patent No.: US 7,787,327 B2
(45) Date of Patent: Aug. 31, 2010

(54) CEMENT BOND ANALYSIS

(75) Inventors: Xiao Ming Tang, Sugar Land, TX (US); Alexei Bolshakov, Pearland, TX (US); Edward Domangue, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/599,919

(22) Filed: Nov. 15, 2006

(65) Prior Publication Data

US 2008/0112262 A1 May 15, 2008

(51) Int. Cl.
*G01V 1/00* (2006.01)
(52) U.S. Cl. .......................................... 367/27; 367/127
(58) Field of Classification Search .................. 367/27, 367/127, 35
See application file for complete search history.

(56) References Cited

U.S. PATENT DOCUMENTS

| | | | | | |
|---|---|---|---|---|---|
| 3,696,884 | A | * | 10/1972 | Lafleur | 367/28 |
| 3,949,352 | A | * | 4/1976 | Vogel | 367/31 |
| 4,129,777 | A | | 12/1978 | Wahl et al. | |
| 4,255,798 | A | * | 3/1981 | Havira | 367/35 |
| 4,709,357 | A | | 11/1987 | Maki, Jr. | |
| 4,800,537 | A | * | 1/1989 | Mount, II | 367/35 |
| 4,805,156 | A | * | 2/1989 | Attali et al. | 367/35 |
| 4,907,204 | A | * | 3/1990 | Medlin | 367/35 |
| 5,089,989 | A | * | 2/1992 | Schmidt et al. | 367/35 |
| 5,467,320 | A | * | 11/1995 | Maki, Jr. | 367/40 |
| 6,018,496 | A | * | 1/2000 | Stanke et al. | 367/35 |
| 6,048,496 | A | * | 4/2000 | Zhou et al. | 422/70 |
| 6,941,819 | B1 | * | 9/2005 | Maki et al. | 73/803 |
| 7,150,317 | B2 | * | 12/2006 | Barolak et al. | 166/254.2 |
| 2005/0190648 | A1 | * | 9/2005 | Tang et al. | 367/35 |
| 2005/0205248 | A1 | * | 9/2005 | Barolak et al. | 166/66.5 |
| 2005/0205268 | A1 | * | 9/2005 | Engels et al. | 166/381 |
| 2006/0198243 | A1 | * | 9/2006 | Tang et al. | 367/35 |
| 2007/0070809 | A1 | * | 3/2007 | Hurst et al. | 367/25 |
| 2007/0070810 | A1 | * | 3/2007 | Hurst et al. | 367/35 |
| 2007/0070816 | A1 | * | 3/2007 | Hurst et al. | 367/159 |

(Continued)

FOREIGN PATENT DOCUMENTS

EP 1698912 A2 9/2006

(Continued)

OTHER PUBLICATIONS

Smaine Zeroug and Benoit Froelich, Ultrasonic Leaky-Lamb Wave Imaging Through a Highly Contrasting Layer, 2003 IEEE Ultrasonics Symposium, pp. 794-798.

(Continued)

*Primary Examiner*—Mark Hellner
(74) *Attorney, Agent, or Firm*—Bracewell & Giuliani LLP (57) ABSTRACT

A method and apparatus for evaluating a bond between a formation and a bonding material. The method includes emitting a shear wave into the tubular, recording the response of the shear wave, and evaluating the response to obtain bond information. The bond information includes bond material thickness and efficacy of the bond between cement and formation. The method includes studying and utilizing the time lag of the direct wave and wave events, as well as the interference of these waves on a spectral graph. A calibration method is included as well.

9 Claims, 5 Drawing Sheets

U.S. PATENT DOCUMENTS

2007/0097788 A1* 5/2007 Tang et al. .................. 367/52
2007/0131417 A1* 6/2007 Bolshakov et al. ..... 166/250.13
2007/0206439 A1* 9/2007 Barolak et al. ............... 367/35

FOREIGN PATENT DOCUMENTS

GB          2399411 A    9/2004
WO       9935490 A1    7/1999

OTHER PUBLICATIONS

Won-Bae Na and Tribikram Kundu, A combination of PZT and EMAT Transducers for Interface Inspection, J. Accust. Soc. Am. 111 (5), Pt. 1, May 2002, pp. 2128-2139.

Bikash K. Sinha and Smaine Zeroug, Applications of sonics and Ultrasonics in Geophysical Prospecting, 1999 IEEE Ultrasonics Symposium, pp. 521-532.

International Search Report dated Sep. 12, 2008.

Written Opinion dated Sep. 12, 2008.

* cited by examiner

CEMENT BOND ANALYSIS

BACKGROUND OF THE INVENTION

1. Field of the Invention

The present disclosure relates to a device and a method for evaluating a cement bond. More specifically, the present disclosure relates to a device and method for evaluating the thickness, quality, and presence of a cement bond. Yet more specifically, the present disclosure concerns a device and method for evaluating a cement bond between cement and formation.

2. Description of Related Art

Hydrocarbon producing wellbores typically comprise casing set within the wellbore, where the casing is bonded to the wellbore by adding cement within the annulus formed between the outer diameter of the casing and the inner diameter of the wellbore. The cement bond not only adheres the casing 8 within the wellbore, but also serves to isolate adjacent zones within the formation from one another. Isolating adjacent zones can be important when one of the zones contains oil or gas and the other zone includes a non-hydrocarbon fluid such as water. Should the cement surrounding the casing be defective and fail to provide isolation of the adjacent zones, water or other undesirable fluid can migrate into the hydrocarbon producing zone thus diluting or contaminating the hydrocarbons within the producing zone.

The cement bond integrity can be assessed by a cement bond evaluation, which may be done by analyzing the attenuation characteristics of acoustic waves along the casing. The quality of the bond between cement and formation rock, however, can be difficult to assess due to the lack of means to quantify the cement layer parameters. If the thickness of the cement layer can be estimated and the coupling of the cement to the formation rock can be assessed, then they can be used to provide important parameters for the cement bond evaluation. For example, if the cement thickness adjacent a section of casing is found to be significantly different from that on an azimuthally opposed section, then the casing may not be centered in the borehole, indicating a poorly performed cementing job.

Downhole tools have been developed for analyzing the integrity of the cement bonding the casing to the wellbore. These downhole tools are typically lowered into the wellbore by wireline in combination with a pulley. The tools may include transducers disposed on their outer surface formed to be acoustically coupled to fluid in the borehole. These transducers are generally capable of emitting acoustic waves into the casing and recording the response of the acoustic waves as they travel, or propagate, across the surface of the casing.

However, the acoustic energy penetration through casing into the cement layer of some of these prior art acoustic techniques is limited by the high impedance contrast between casing and borehole fluid. In some of these devices, the acoustic waves are directed radially or at an angle to the casing surface and thus the highly rigid casing impairs the energy transmission into the casing. Additionally, it may be difficult to characterize the reflection signals arising from the inner and outer walls of the cement using prior art devices. The interference of currently used wave modes seriously impairs the recognition of the reflection effect; the interference of the wave modes and their reflections occurs when the wavelength in the cement layer becomes comparable with or exceeds cement layer thickness, which is a common scenario in oil field conditions. Moreover, these waves are also highly dispersive in the frequency range of the reflection measurement, making it difficult to characterize the reflection signals when the interference occurs. Nuclear logging techniques using gamma-ray penetration through casing have also been proposed for assessing bond integrity.

BRIEF SUMMARY OF THE INVENTION

A method and apparatus for evaluating a bond between a formation and a bonding material. The method includes emitting a shear wave into the formation, where the shear wave creates a direct wave and a wave event, monitoring the direct wave and the wave event, and evaluating the monitored waves to obtain bond information. The bond information includes bond material thickness and efficacy of the bond. The method includes studying and utilizing the time lag of the direct wave and wave events, as well as the interference of these waves on a spectral graph. A calibration method is included as well.

BRIEF DESCRIPTION OF THE SEVERAL VIEWS OF THE DRAWING

FIG. 3b is a wave spectrum of some of the recorded responses of FIG. 3a.

FIG. 5b is a wave spectrum of some of the recorded responses of FIG. 5a.

DETAILED DESCRIPTION OF THE INVENTION

Figure 1:
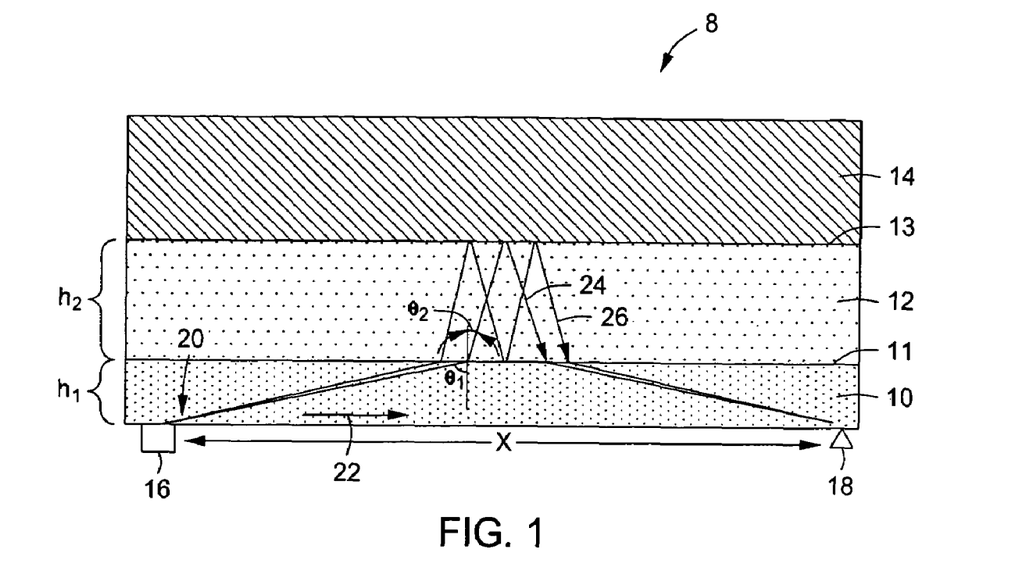
FIG. 1 is a cutaway view of a casing-bond-formation structure illustrating propagation of a wave therein.

In an embodiment of the method and device herein described, acoustic waves are induced into a bonding material and the resulting signal within is measured and analyzed. With regard now to FIG. 1, an example of an acoustic signal 20 is shown propagating through a cross sectional portion of a cased downhole wellbore 8. The cased wellbore 8 of FIG. 1 includes a section of casing 10, a layer of cement 12, and a downhole formation 14, where the cement 12 adheres the casing 10 to the formation 14. A source 16 for generating the acoustic signal 20 is provided at a first location and a receiver 18 for receiving the acoustic signal 20 is disposed at a second location. As shown in FIG. 1, the distance between the source 16 and the receiver 18 is denoted by the reference identifier "x". As elaborated below, the signal source 16 and the signal receiver 18 can be included with a downhole tool 28 used for casing bond evaluation. The source 16 for generating the acoustic signal 20 may comprise a piezoelectric device, an electromagnetic acoustic transmitter, a pulsed laser device, a flexural resonator, a wedge transducer, and combinations thereof.

The acoustic signal 20 illustrated comprises a direct signal 22, a first wave event 24, and a second wave event 26. As its name implies, the direct signal 22 travels from the source 16 directly to the receiver 18 without leaving the casing 10. The first wave event 24 passes across the casing/cement interface 11 where it is transmitted into the cement 12. After passing through the cement 12 the first wave event 24 reflects from the cement/formation interface 13 and passes back through the cement 12 where it crosses the casing/cement interface 11. After traveling past the casing/cement interface 11 the wave event 24 travels through the casing 10 and onto the receiver 18. Similarly, the second wave event 26 also passes across the casing/cement interface 11 into the cement layer 12 and reflects from the cement/formation interface 13 towards the casing 10. Unlike the first wave event 24 though, the second wave event 26 does not pass directly into the casing 10 after reflecting back from the cement/formation interface 13, but instead reflects from the casing/cement interface 11 back into the cement layer 12 for another reflection cycle. After returning to the casing/cement interface 11, the second wave event 26 is transmitted into the cement 12 and to the receiver 18. Since the direct wave 22 has the shortest travel of the multiple wave events, it can arrive at the receiver 18 before the other waves, and as such is labeled a "0" wave. Similarly, the first wave event 24 (labeled "1") can arrive at the receiver before the second wave event 26 (labeled "2"). While a number of wave events (i.e. 0, 1, 2, 3, 4, . . . , n) can occur by the generation of a signal within the casing 10, for simplicity, only a few will be discussed herein. However, the scope of the method and apparatus herein discussed is not limited to the wave events specifically discussed, but may include all possible wave events.

Figure 2:
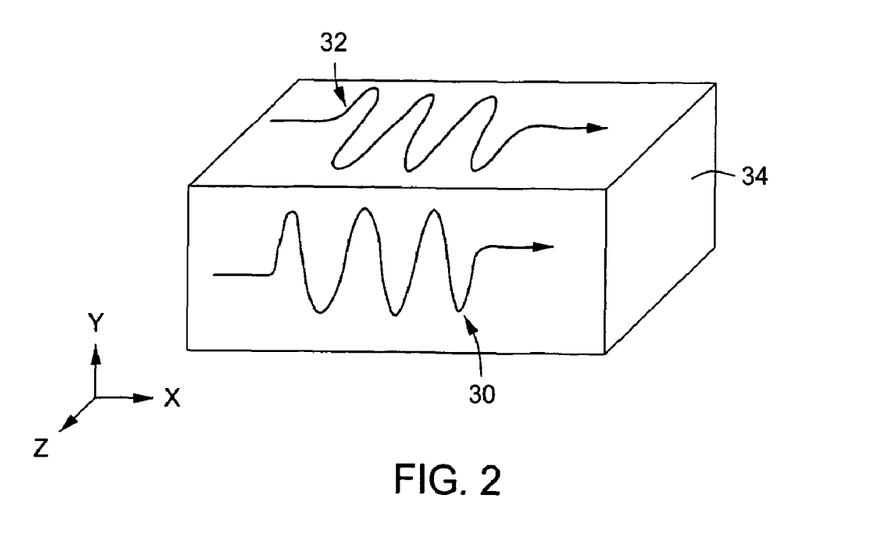
FIG. 2 depicts shear waves propagating through a medium.

The wave modes considered for use with the present method and apparatus include shear waves, compressional waves, Rayleigh waves, and Lamb waves. With regard to the shear waves, they can include those polarized substantially in the vertical and in the horizontal direction. Included with the polarized waves is the transversely polarized shear wave whose polarization is substantially perpendicular to its propagation. FIG. 2 provides some examples of shear waves propagating through a medium 34, included with FIG. 2 is an X/Y/Z coordinate axis provided for reference. The shear waves included with FIG. 2 are a vertical shear wave 30 and a transversely polarized shear wave 32. The arrow of both shear waves (30, 32) demonstrates the wave motion propagation whereas the curve of the line representing the waves illustrates the wave particle movement. The direction of the wave particle movement is also referred to as its polarization. Thus the vertical shear wave 30 propagates along the length of the medium (in the X direction) causing particle movement within the medium 34 primarily in the vertical (in the Y direction). The transversely polarized shear wave 32, which propagates along the medium's upper surface also in the X direction, is polarized in a substantially horizontal orientation (in the Z direction).

More specifically, as will be explained in more detail below, analyzing the interference between the direct signal 22 (also referred to herein as a direct arrival) and the multiple wave events yields useful information concerning the cement. Such information includes, cement thickness, the presence of cement, the cement bond at the casing, and the cement bond at the formation.

Figure 3A:
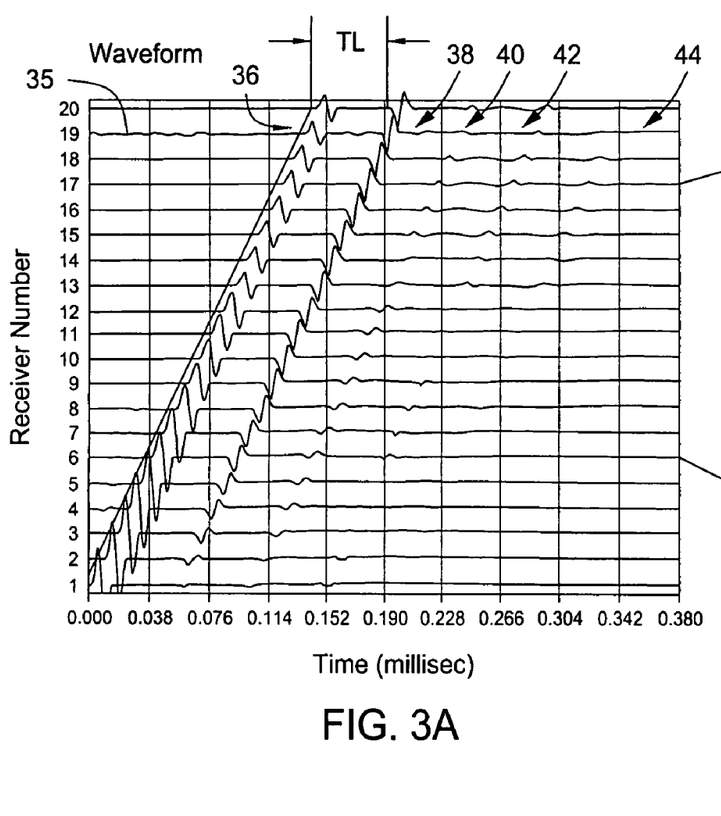
FIG. 3a illustrates a wave response recorded by a series of receivers.

FIG. 3a comprises a graph illustrating synthetically modeled waveforms propagating through the casing/cement configuration of FIG. 1. In this model an array of 20 receivers are set apart at 2.5 cm to receive the wave response. The wave signal is produced by a 100-kHz center frequency wave source. The modeling is for the transversely polarized shear wave 32. The theory and method for modeling this wave in a layered elastic media can be found in Aki and Richards (1980) (*Quantitative seismology: theory and methods:* W. H. Freeman and Co.). Similar modeling has also been done for the vertical shear wave 30 using the theory and method of Aki and Richard (1980). However, for the purpose of brevity, the illustrations hereon refer only for the transversely polarized shear wave, although the method and apparatus described herein apply to other types of waves.

Multiple wave events (36, 38, 40, 42, and 44) are recorded by the receivers, but the higher order events are more evident at the far receivers. For the purposes of clarity, the wave events are identified on the signal 35 recorded by receiver 19. As expected, the direct wave event 36 is the first event recorded by receiver 19, the first (38), second (40), third (42) and fourth (44) are also seen on this signal. It should be noted that the resulting moveout of the direct wave 36 at the successive recorders is largely the same for each of the higher order events (38, 40, 42, and 44) as received by the recorders.

The direct wave 36 is analogous to the fundamental wave mode (referred to as $SH_0$ when the signal is a transversely polarized shear wave) in an unbonded casing (i.e., free pipe). The $SH_0$ mode is non-dispersive and propagates at the shear velocity of the casing. When casing is bonded with cement, the $SH_0$ wave shows attenuation at least in part due to wave energy leakage into cement, as is clearly seen in FIG. 3a. As noted above, the moveout of the wave events (38, 40, 42, 44) appears to be the same as that of the direct wave 36, i.e., the wave event propagation appears to be substantially the same as the casing shear velocity. A time lag exists between subsequent wave events, i.e. between the direct wave 36 and the first wave event 38, between the first wave event 38 and the second wave event 40 and so on. In FIG. 3a "TL" denotes the time lag between the direct and first wave events (36, 38). From the synthetic modeling results, the time lag between the subsequent wave events was found to be fairly constant. Optimal results are found with the present method using the fundamental wave mode ($SH_0$) and for frequencies of up to around 200 kHz.

Figure 3B:
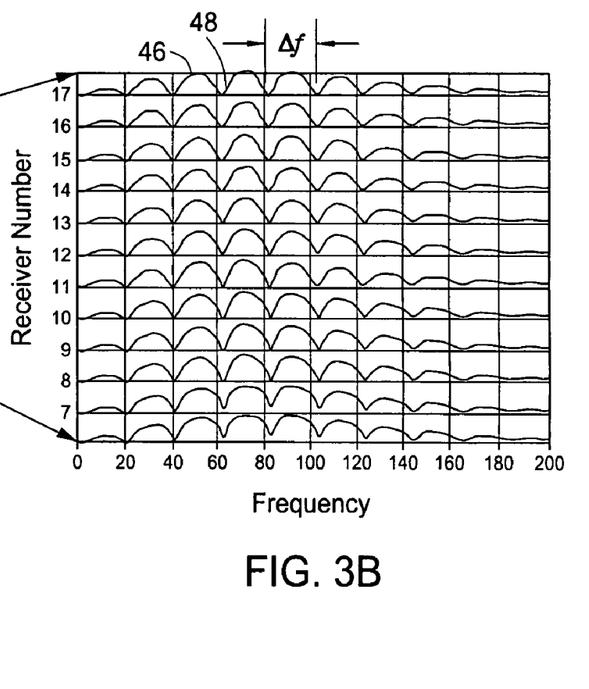

FIG. 3b provides an example of a plot of a wave spectrum recorded by the receiver array. The wave spectrum is computed by taking the amplitude of the Fourier transform of the waveform trace in FIG. 3a. The plot comprises signals recorded by receivers 6 through 17 of FIG. 3a, these receivers correspond to 15 cm to 42.5 cm from the signal source in the model. Wave interference between waves having a nearly constant moveout velocity and time lag results in the periodic pattern of the wave spectrum seen in FIG. 3b. This pattern is more recognizable with increased distance away from the source. The pattern (also referred to as a frequency response pattern) comprises a series of periodically repeating peaks 46 and troughs 48 (or holes). The spectral location of the peaks/troughs and the frequency interval $f$ between two adjacent troughs/peaks are closely related to the time lag TL and can be used to estimate the thickness of the cement layer behind casing, as will be demonstrated below. Table 1 below lists the parameters used to model the waveforms of FIGS. 3a and 3b.

TABLE 1

| | S-velocity (m/s) | Density (g/cc) | Thickness (cm) |
|---|---|---|---|
| Casing | 3300 | 7.7 | 0.635 |
| Cement (LWC) | 1000 | 1.1 | 2.5 |
| Formation | 1600 | 2.4 | infinity |

As noted above, the multiple wave events shown from the theoretical modeling (FIG. 1 and FIG. 3) are caused by wave transmission/reflection at the casing-cement and cement-formation boundaries. The nearly constant moveout velocity and time lag of the waves are due in part to the result of the large shear velocity contrast between casing and cement, especially for light weight cement. To substantiate these statements, reference is now made to FIG. 1 where the acoustic signal 20 is assumed to be a fundamental mode shear wave $SH_0$ that is incident onto the casing/cement interface 11 from the casing side. The angle of incident, $\theta_1$, and the angle of refraction $\theta_2$, in the cement are governed by Snell's law;

$$\sin\theta_2 = \frac{v_2}{v_1}\sin\theta_1, \quad (1)$$

where $v_1$ and $v_2$ denote the shear velocity of the casing 10 and cement layer 12, respectively. As discussed above, the signal 20 can take a direct path to the receiver 18, or can reflect within the cement 12. In principle, there are an infinite number of such reflection cycles, giving rise to the multiple wave events seen in FIG. 3a. The incident and refraction angles of the multiples are governed by equation (1) and the following constraint equation, $$x = 2h_1 \cdot \tan\theta_1 + 2nh_2 \cdot \tan\theta_2, (n=1,2,\ldots) \quad (2)$$

where n denotes the order number of the reflection multiples; $h_1$ and $h_2$ denote the thickness of the casing 10 and cement layer 12, respectively. Equation (2) means that the projection of the wave path of the nth multiple onto the casing surface must equal the source-receiver distance x. The travel time $t_n$ of the nth multiple is:

$$t_n = 2\left(\frac{h_1}{v_1 \cos\theta_1} + \frac{nh_2}{v_2 \cos\theta_2}\right), (n=1, 2, \ldots). \quad (3)$$

Solving equations (1) and (2) simultaneously $\theta_1$ and $\theta_2$ can be calculated for the nth multiple and use the angles in equation (3) to calculate its travel time.

The total wave data, expressed in the frequency domain, is the sum of direct wave and reflection multiples. The wave spectrum of the direct wave and the nth multiple wave, is respectively given by, $$W_d(f) = S(f)e^{-\alpha x + i\omega t_0}; \quad (4)$$
$$W_n(f) = S(f) \cdot T_1 \cdot T_2 \cdot r_c^{n-1} r_r^n \cdot e^{i\omega t_n}, (n = 1, 2, \ldots)$$

with:

$S(f)$ = source spectrum; $\omega = 2\pi f$; $t_0 = x/v_1$ $T_1 = \frac{2\rho_1 v_1 \cos\theta_1}{\rho_1 v_1 \cos\theta_1 + \rho_2 v_2 \cos\theta_2} =$ casing-to-cement transmission coefficient $T_2 =$ cement-to-casing transmission coefficient $r_c = \frac{\rho_2 v_2 \cos\theta_2 + \rho_1 v_1 \cos\theta_1}{\rho_2 v_2 \cos\theta_2 + \rho_1 v_1 \cos\theta_1} =$ cement-casing reflection coefficient $r_r$ = cement-rock reflection coefficient Note the direct wave has an attenuation term $e^{-\alpha x}$ to account for the amplitude attenuation along casing. The wave travel times $t_n$ is given by equation (3). The cement-to-casing transmission coefficient $T_2$ is obtained by exchanging subscripts 1 (denoting casing) and 2 (denoting cement) in the formula for $T_1$. Similarly, the cement-rock reflection coefficient $r_r$ is obtained by replacing quantities associated with subscripts 1 (denoting casing) with those of the formation rock in the formula for $r_c$.

Figure 4A:
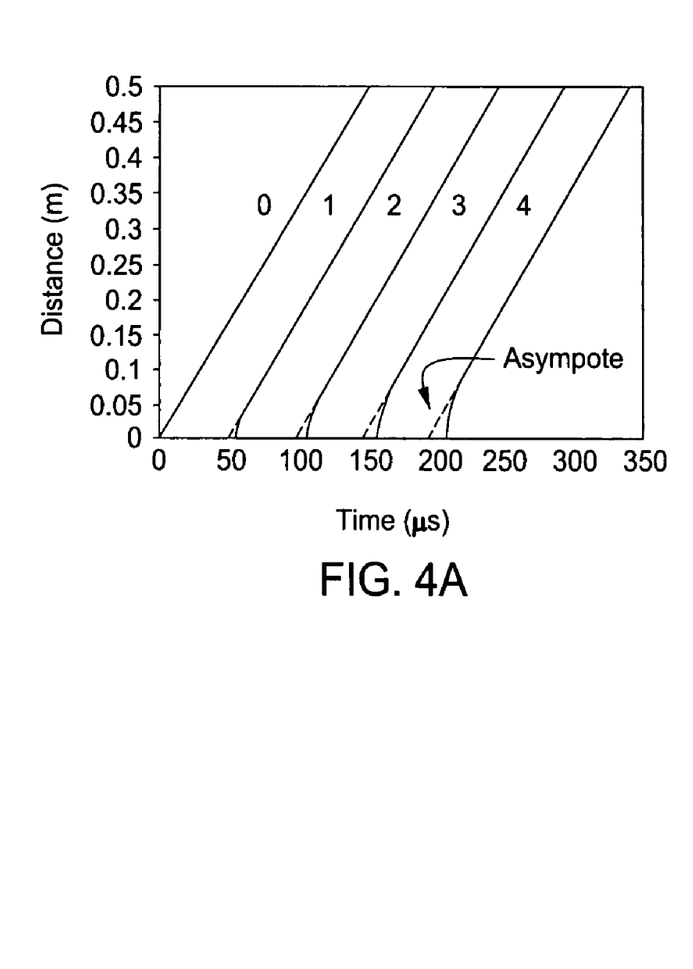
FIG. 4a is a graph plotting distance vs. time for wave events.
Figure 4B:
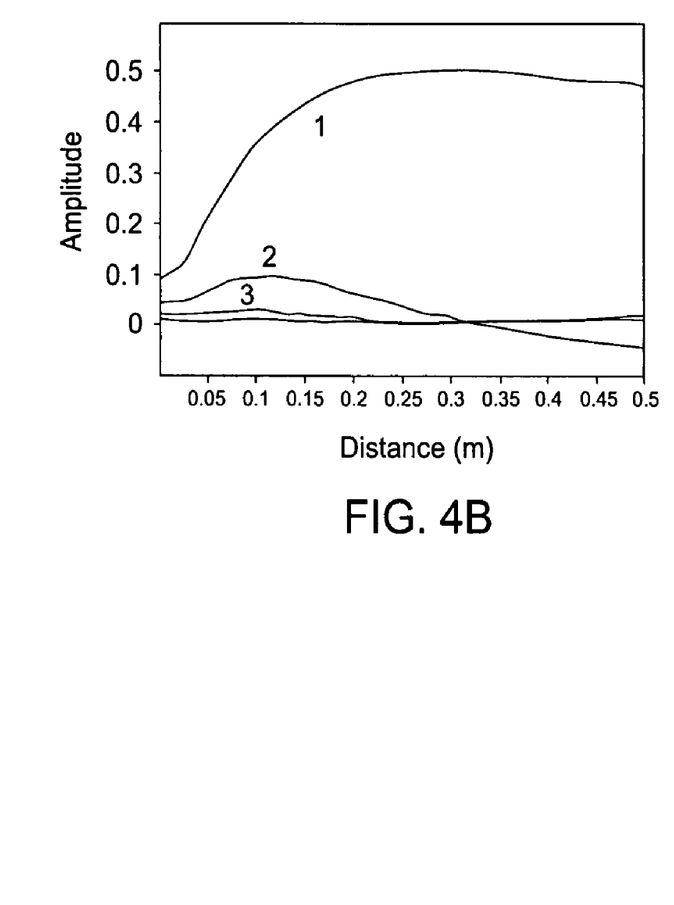
FIG. 4b is a graph plotting amplitude vs. distance for wave events.

To demonstrate that the multiple-reflection model described in equation (4) can satisfactorily model the multiple waves in full wave data (FIG. 3a), the wave travel time and amplitude for the first 4 multiples can be calculated using equations (1) through (4) with the same parameters used to generate the plot of FIG. 3a. FIG. 4a depicts the travel time versus distance for wave events 0 through 4. Also shown FIG. 4a, as a dotted line, is the asymptotic travel time solution to be described. FIG. 4b includes plots of wave signal amplitude for wave events 0 through 4 versus distance from the source. Note the dominance of the first multiple and the zero-crossing of the higher order multiples in FIG. 4b, as compared to the data of FIG. 3a. The direct and reflection waves travel time agrees with the arrival time of the wave events respectively labeled in FIG. 3a. Moreover, the wave amplitude variation characteristics for events 1, 2, 3, etc., (i.e., the amplitude increase of event 1 with x and the zero-crossing of other events), are satisfactorily modeled. The result also shows the dominance of the first reflection multiple compared to the rest of the multiples.

To facilitate the application of the reflection/transmission theory (equations (4)) and to further explain the multiple wave characteristics in FIG. 3 and FIG. 4, an asymptotic analysis is performed to obtain the solution of equations (1) through (3) at large distances. For the asymptotic analysis, it is assumed that $x \gg h_1$ and $x \gg h_2$. Notice for the casing and cement scenario, $v_1/v_2 \sim 2\text{-}3$. It follows that $\theta_1$ approaches 90° as measurement distance x increases, while $\theta_2$ is confined to a small angular range, i.e., $\theta_2 < \sin^{-1}(v_2/v_1)$ (see FIG. 1). Under these conditions, the following relationship is found from equations (1) and (2);

$$\sin\theta_1 \sim 1 - \frac{2 \cdot (h_1/x)^2}{\left(1 - 2n(h_2/x)v_2 / \sqrt{v_1^2 - v_2^2}\right)^2}, (x \gg h_1; x \gg h_2; v_1 > v_2) \quad (5)$$

for the nth multiple. The travel time then becomes;

$$t_n \sim \frac{x}{v_1} + \frac{2nh_2}{v_2}\sqrt{1 - (v_2/v_1)^2}, (n = 0, 1, 2, \ldots) \quad (6)$$

As seen from FIG. 4a, the reflection travel time quickly approaches the above asymptotic solution (dotted line) as distance increases. With reference now to equation (6), the travel time of the direct arrival along the casing is shown by: $t_0 = x/v_1$. The apparent moveout velocity of the nth multiple along casing is:

$$\frac{dx}{dt_n} = v_1. \quad (7)$$

The time lag, TL, between two adjacent multiples, or between the first multiple and the direct arrival, is given by:

$$TL = t_n - t_{n-1} = \frac{2h_2}{v_2}\sqrt{1-(v_2/v_1)^2}, (n = 1, 2, \cdots) \quad (8)$$

Equation (8) relates the time lag to the cement thickness. The time lag, under the large x and $(v_2/v_1)^2 \ll 1$ conditions, is almost the two-way (shear) travel time perpendicularly across the cement layer.

From equation (8), the wave time lag is dependent on the cement thickness, thus the cement thickness can be estimated from a known the time lag. One approach is to measure the lag from the shear wave data at large distances from the source, as shown in FIG. 3a. By directly detecting the reflection events from the measured wave signals (for example, when the acoustic pulse duration is short and cement is thick), the time lag between the direct wave and first reflection multiple may be measured as well as the time lag between two adjacent reflection multiples. It follows from equation (8) that the cement thickness may be calculated from the time lag TL as:

$$h_2 = \frac{v_2}{2\sqrt{1-(v_2/v_1)^2}} \cdot TL. \quad (9)$$

assuming that the casing and cement shear velocity values are known. If there is overlap between the signals (e.g., between direct and first reflection, or between the adjacent reflections), then various signal processing techniques may be used to smooth the overlap effect, provided the degree of overlap is not severe.

Optionally, spectral methods may be employed to analyze recorded wave data, such as the time lag. As above, this analysis can be useful for determining casing thickness. The wave spectral data, modeled as comprising the direct wave and reflection multiples, is obtained from equations (4).

A total wave spectrum is shown below by summing the direct wave and all reflection multiples and using the large x solution (equations (5)-(8)).

$$W(f) = W_d + \sum_{n=1}^{\infty} W_n \quad (10)$$
$$= S(f)e^{-\alpha x + i\omega t_0} + S(f)e^{i\omega t_0}T_1 \cdot T_2$$
$$(r_r \cdot e^{i\omega TL} + r_c r_r^2 \cdot e^{i2\omega TL} + r_c^2 r_r^3 \cdot e^{i3\omega TL} + \ldots,)$$
$$= S(f)e^{i\omega t_0}\frac{e^{-\alpha x} + (r_c e^{-\alpha x} + T_1 \cdot T_2)r_r e^{i\omega TL}}{1 + r_c r_r e^{i\omega TL}}$$
$$\left(\text{Note: } TL = 2h_2\sqrt{1-(v_2/v_1)^2}/v_2\right)$$
$$\Rightarrow$$
$$|W(f)| = |S(f)| \cdot M(f)$$

where |.| denotes taking the magnitude of the complex quantity inside. In summing the infinite series in equations (10), it is assumed that the angles of incidence and refraction (see equation (1)) of the reflection multiples do not vary significantly for a given distance x (as implied in equation (5)), so that the transmission and reflection coefficients in the equation are treated as invariant for all multiples. (Note the angles and consequently, the coefficients, may change significantly with x, especially near the source, resulting in the change of wave amplitude with distance, see FIGS. 3a-4b).

Equations (10) indicate that the amplitude spectrum of the total wave is modulated by a modulation function.

$$M(f) = \left|\frac{e^{-\alpha x} + (r_c e^{-\alpha x} + T_1 T_2)r_r e^{i\omega \cdot TL}}{1 + r_c r_r e^{i\omega \cdot TL}}\right|, \quad (11)$$

(direct wave + all multiples)

In an actual measurement, the time duration of a wave signal may be limited such that only one or a few multiples are included in the data. Because the first multiple tends to be the largest of all multiples (see FIGS. 3a-4b), the data can be approximated as the sum of the direct wave with the first multiple. The modulation function for the two waves (direct plus first multiple) may be obtained by taking the first term of the infinite series in equations (10).

$$M(f) = |e^{-\alpha x} + T_1 T_2 r_r e^{i\omega \cdot TL}| \quad (12)$$
$$= (e^{-2\alpha x} + (T_1 T_2 r_r)^2 + 2e^{-\alpha x}T_1 T_2 r_r \cos(\omega \cdot TL))^{1/2},$$

(direct wave + first multiples)

Equations (11) and (12) demonstrate that, regardless of the number of reflection multiples contained in the data, one or more, the modulation function is a periodic function in the frequency domain. The function periodically exhibits peaks and troughs along the frequency axis, with a period given by:

$$\Delta f = 1/TL. \quad (13)$$

This periodic modulation is clearly demonstrated by the modeled spectral data in FIG. 3b.

The locations of the peaks/troughs are found from roots of the derivative function M'(f). For both equations (10) and (11) the derivative function has the form $$M'(f) = \frac{dM(f)}{df} \propto sgn(r_c) \cdot \sin(\omega \cdot TL). \quad (14)$$

The sign of cement-rock reflection coefficient $r_r$ (whether it is + or −), has a direct influence on the property of the peaks/troughs, as will be seen below. The roots of the derivative function are found by setting M'(f)=0, as $$f_m = \frac{m}{2 \cdot TL}, (m = 1, 2, 3, \ldots) \quad (15)$$

Thus, the locations of the peaks/troughs are given by $$f_m = \begin{cases} \frac{0.5m}{TL}(m=1,3,5,\ldots) \begin{cases} \text{peaks}, & (sgn(r_r) > 0) \\ \text{troughs}, & (sgn(r_r) < 0) \end{cases} \\ \frac{m}{TL}(m=1,2,3,\ldots) \begin{cases} \text{peaks}, & (sgn(r_r) < 0) \\ \text{troughs}, & (sgn(r_r) > 0) \end{cases} \end{cases} \quad (16)$$

Note whether $f_m$ corresponds to a peak or trough depends on $sgn(r_r)$. From equation (16) it can be seen that the modulation function spectral peaks/troughs locations are controlled only by the time lag TL. The degree of modulation depends on the transmission and reflection coefficients (especially $r_r$) within the layered system and the number of reflection multiples contained in the data. Based on the result given in equation (16), the following methods can be derived for estimating the cement thickness and evaluate the bonding condition.

Equation (17) below provides another embodiment of determining cement thickness; this relationship is based at least in part on equation (13) where the determination of casing thickness is based on the period $\Delta f$. This relationship is applicable in at least the situation where the wave signal spectrum covers a range in which the spectral interval between two adjacent peaks/troughs (i.e., the period $\Delta f$) can be measured $$h_2 = \frac{v_2}{2 \cdot \Delta f \cdot \sqrt{1 - (v_2/v_1)^2}}. \tag{17}$$

The spectral data in FIG. 3b is used as an example to demonstrate this method. The synthetic data used in this example has a wide spectral band so that spectrum shows several peaks and roughs. An actual measurement data generally has a limited spectral band-width. But if the band width is larger than $\Delta f$, it is then possible to locate two adjacent peaks/troughs in the spectrum and determine $\Delta f$ as the length of the spectral interval between the adjacent peaks/troughs. For the example of FIG. 3b, the period $\Delta f$ between adjacent troughs is about 21 kHz. The shear velocity values are: $v_1$=3300 m/s and $v_2$=1000 m/s (Table I). Using these values in equation (17) gives an estimated value of 2.5 cm for the cement thickness, in agreement with its true value in Table I.

In yet another embodiment, the cement thickness may be obtainable via the trough location $f_m$ of the spectral data of FIG. 3b. This technique has particular usefulness in situations when the signal spectrum is narrow-banded, such that only one spectral trough is measured. In this case, equation (16) may be utilized to estimate the cement thickness, provided that the order number m of the measured trough is given. For a narrow source spectrum $S(f)$, it is preferred to measure troughs rather than peaks, because the peak of $S(f)$ may be indistinguishable from those of the modulation function M(f). Using the trough location given by equation (16) with $sgn(r_r) > 0$, the cement layer thickness may be determined as:

$$h_2 = \frac{m \cdot v_2}{2 \cdot f_m \sqrt{1 - (v_2/v_1)^2}}. \tag{18}$$

The spectral data in FIG. 3b is used as an example to demonstrate the method of determining cement thickness from trough location. For example, the location of the 5$^{th}$ trough $f_5$ (m=5) is about 105 kHz. Using this value in equation (18) provides an estimated value of 2.5 cm for the cement thickness, in agreement from the value obtained using method 2. For narrow-banded data containing only one trough, however, the order number m needs to be determined. This relates to a calibration method to be described later.

In yet another embodiment of analyzing wave data, the cement formation bonding condition can be estimated based on the value of $r_r$ (the cement/rock reflection coefficient). Of all the reflection/transmission coefficients involved in equations (4) and (9), the cement-formation reflection coefficient $r_r$ has a direct influence on the reflection multiples and the resulting spectrum interference/modulation pattern. Because of the large shear velocity contact between steel casing and cement, the refraction angle in cement is quite small. (For a light weight cement (LWC), $\theta_2 < 20°$.) As a result, $r_r$ can be approximated by its normal incidence formula:

$$r_r \sim \frac{\rho_r v_r - \rho_2 v_2}{\rho_r v_r + \rho_2 v_2} \Rightarrow \begin{cases} 0 < r_r < 1, & (\rho_r v_r > \rho_2 v_2) \\ r_r \sim -1, & (\rho_r v_r \sim 0) \end{cases} \tag{19}$$

In many cases, the formation rock has greater density and velocity values than cement (especially for an LWC), such that $0 < r_r < 1$. If formation is poorly bonded with cement, or formation is detached from cement, then the material in contact with the cement (debris or fluid) has very low shear rigidity such that $v_r \sim 0$, resulting in $r_r \sim -1$. This means that the reflection amplitude increases and its polarity is flipped, relative to the case with good bonding. This scenario is described in the following.

Figure 5A:
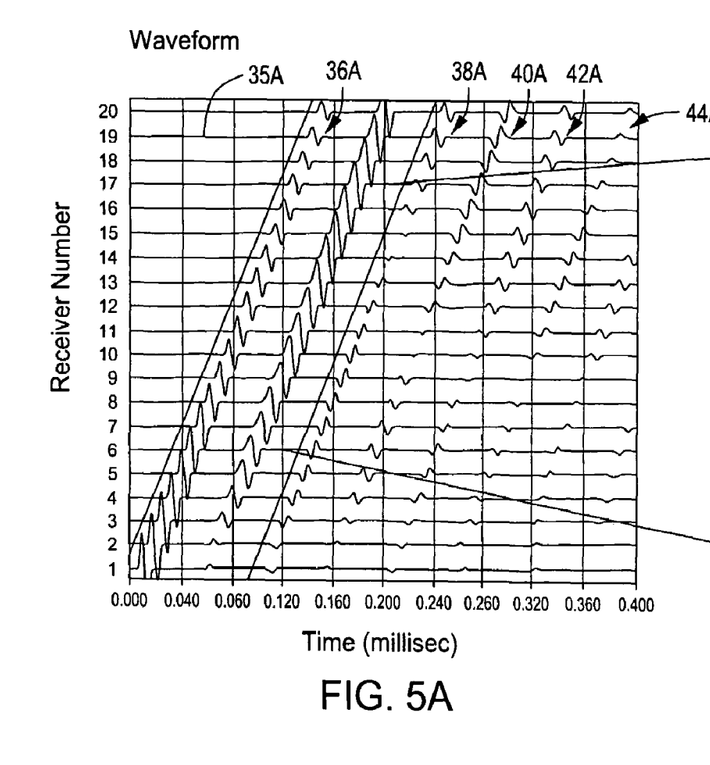
FIG. 5a illustrates a wave response through an unbonded tubular recorded by a series of receivers.
Figure 5B:
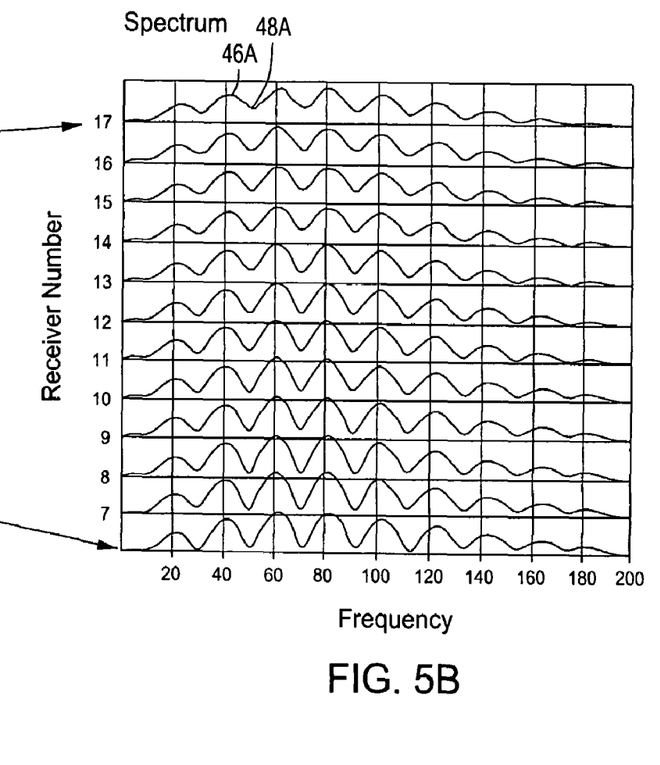

Like FIGS. 3a and 3b, FIGS. 5a and 5b illustrate synthetic waveforms propagating through casing set in a wellbore. The model parameter data used to create the wave form response of FIGS. 5a and 5b is the same used to create that of FIGS. 3a and 3b. FIG. 5a, which represents the modeled wave response propagating from a source through a set casing and recorded by receivers (numbered 1-20), includes a direct wave 36a and first through fourth wave events (38a, 40a, 42a, and 44a). Unlike the plot of FIGS. 3a and 3b however, the plots of FIGS. 5a and 5b model waveforms traveling across unbonded casing. Due to the non-bound situation there is no wave propagation through the formation, thus $v_r$=0. Indeed, as compared to FIG. 3b, the reflection amplitude of the phase plot of FIG. 5b is substantially increased and its polarity is flipped. Note the peak 46 of FIG. 3b has a corresponding frequency of 50 hz, whereas a trough 48a occurs at 50 hz on FIG. 5b. Because the sign of $r_r$, $sgn(r_r)$, dictates whether a root of $M'(f)=0$ corresponds to a peak or trough (equation (16)), the location of a spectrum trough (peak) in FIG. 3b, corresponding to $sgn(r_r) > 0$, now becomes the location of a peak (trough) in FIG. 5b, corresponding to $sgn(r_r) < 0$. Note that the wave spectra are calculated using the direct and first reflection waves only, as indicated by the time window in the waveform plot, assuming these two wave events dominate the data measured in a finite time window. (As discussed before, including one or more reflections in the wave spectrum calculation does not change the location of the spectral peaks/troughs.) Based on this phenomenon, a method can be provided to evaluate the bonding condition at the cement-formation boundary.

In the actual measurement, the spectral location of a trough on the measured spectrum can be tracked along different parts of casing. Based on the above described phenomenon, the disappearance of the trough and/or the appearance of a spectrum peak at the designated spectral location can be used to indicate the poor bonding condition at the cement-formation interface. Further, if the formation is not detached from cement, tracking the variation of the trough height/depth can provide an assessment of the bonding condition. The value of $r_r$ directly controls the reflection amplitude, accordingly value of $r_r$ affects the degree of modulation on the wave spectrum (see equation (11) or (12)). As such, by tracking the spectral trough and variation of the trough depth/height, the variation of $r_r$ caused by a change in $\rho_r v_r$ can be detected. Since a change in $\rho_r v_r$ reflects the shear rigidity of the material adjacent to the cement, an assessment on the degree of bonding can be obtained by measuring this change.

Yet further optionally, calibration for measuring the thickness variation along the casing may be included with the methods herein disclosed. In the calibration method, a trough location $F_m$ is measured at one part of the casing with known cement thickness H. The order number m of the $m^{th}$ trough can be calibrated by using equation (18) as:

$$m = \frac{2\sqrt{1-(v_2/v_1)^2}}{v_2} H \cdot F_m \qquad (20)$$

Then, at another part of the casing, where the measured trough location is $f_m$, the cement thickness h can now be calculated using the following relationship:

$$h = \frac{m \cdot v_2}{2 f_m \sqrt{1-(v_2/v_1)^2}} = \frac{F_m}{f_m} H \qquad (21)$$

With the calibration to a known cement thickness, the cement thickness variation can be measured by tracking the variation of the spectral trough location along casing. In an actual measurement, the spectral data enclosing (at least one) spectral trough location is recorded for every measurement position or path along a cased borehole. A graph of the data along the measurement path allows for the tracking of the spectral trough and its variation. The variation of the spectral trough location $f_m$, according to equation (21), delineates the variation of the cement thickness for the measurement path along casing.

Figure 6:
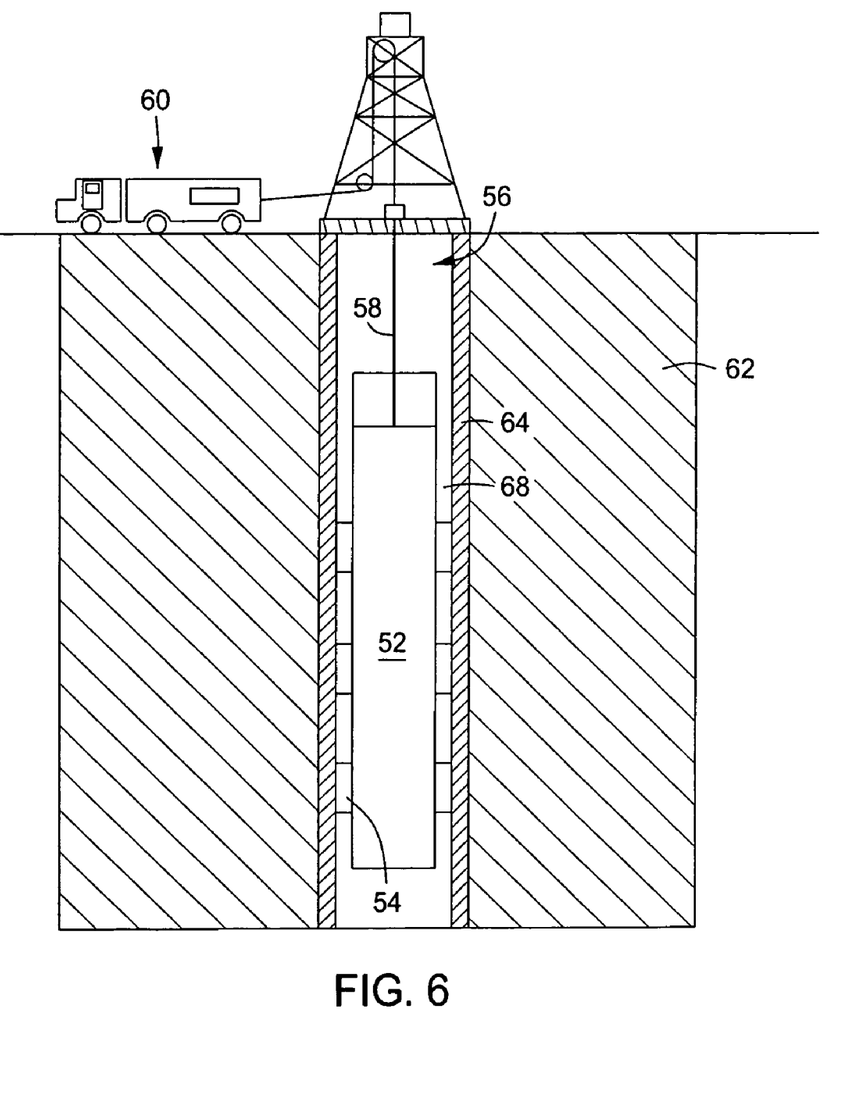
FIG. 6 is a side view of a downhole tool in accordance with the present disclosure disposed in a wellbore.

Reference is now made to FIG. 6 wherein a sideview of a downhole tool 52 is shown disposed in a wellbore 56. A casing 68 is shown in the wellbore 56 and secured to the surrounding formation 62 with a bond 64. The bond 64 considered is any substance that can adhere the casing within the formation 62 that surrounds the wellbore 56, including any type of currently used or later developed cement, which includes polymeric substances. Transducers 54 are provided with the downhole tool 52, the transducers 54 may comprise a signal source for creating an acoustic signal as described above. With regard to the downhole tool 52 of FIG. 6, an acoustic signal created by the tool will be induced into the casing 68 thereby creating a direct signal that propagates solely within the casing 68 and other wave events (0-m) that pass through the casing 68 and into the bond 64. The transducers 54 may also be used to receive the resulting signal(s) that reflect within the bond 64 before being transmitted back through the casing 68.

The recorded signals may be stored within the downhole tool 52 for later analysis or can be transmitted to the surface, such as via wireline 58, for realtime analysis. The analysis considered includes the steps and methods described above, including the steps and methods that comprise receiving time domain wave data and analyzing that data to determine bond thickness and bond efficacy, as well as calibration steps. An analyzer may be employed that is specifically configured to perform said analysis steps used in conjunction with the recorded acoustic signals. The analyzer may be disposed with the downhole tool 52 or otherwise disposable within a wellbore 56. Optionally, the analyzer may be solely at the surface.

One specific example of an analyzer is an information handling system (IHS). An IHS may be employed for controlling the generation of the acoustic signal herein described as well as receiving the controlling the subsequent recording of the signal(s). Moreover, the IHS may also be used to store recorded data as well as processing the data into a readable format. The IHS may be disposed at the surface, in the wellbore, or partially above and below the surface. The IHS may include a processor, memory accessible by the processor, nonvolatile storage area accessible by the processor, and logics for performing each of the steps above described.

Embodiments of the methods and devices described herein, therefore, are well adapted to carry out the objects and attain the ends and advantages mentioned, as well as others inherent therein. While a presently preferred embodiment has been given for purposes of disclosure, numerous changes exist in the details of procedures for accomplishing the desired results. For example, the device and method are not limited to being wireline conveyed, but can be suspended by any known means, such as tubing, coiled tubing, or slickline as well as any later developed means. Additionally, the device and method can be used in conjunction with downhole drilling or other boring operations. These and other similar modifications will readily suggest themselves to those skilled in the art, and are intended to be encompassed within the spirit of the present invention disclosed herein and the scope of the appended claims.

What is claimed is:

1. A method of evaluating a bond between a subterranean formation and a casing comprising:
   inducing a transversely polarized shear wave into the casing, wherein the transversely polarized shear wave creates a direct wave in the casing and a wave event in the bond;
   monitoring the direct wave and the wave event;
   determining, in the frequency domain, the time lag between the monitored direct wave and the monitored wave event; and
   estimating the bond thickness based on the frequency domain time lag.

2. The method of claim 1 further comprising creating a wave spectrum by graphing the direct wave and the wave event monitored signals in the frequency domain, wherein the wave spectrum comprises a series of repeating peaks and troughs; and
   determining time lag from the frequency interval between adjacent peaks or troughs.

3. The method of claim 1, wherein the bond thickness ($h_2$) is found by the following relationship:

$$h_2 = \frac{v_2}{2\sqrt{1-(v_2/v_1)^2}} \cdot TL$$

where TL is the time lag, $v_2$ is wave velocity through the bond material, and $v_1$ is wave velocity through the tubular.

4. The method of claim 1, wherein the wave event comprises a first wave event.

5. The method of claim 1 wherein the wave event comprises multiple wave events.

6. The method of claim 1, wherein the step of inducing the transversely polarized shear wave is accomplished by an electro-magnetic acoustic transmitter.

7. The method of claim 1 further comprising determining the bond quality.

8. The method of claim 7 wherein the bond quality is poor if $\rho_r v_r \sim 0$, where $\rho_r$ is the density of a formation adjacent the tubular and $v_r$ is the shear velocity through the formation.

9. The method of claim 7 wherein the bond quality is good if $\rho_2 v_2 > \rho_r v_r$, where $\rho_r$ is the density of a formation adjacent the tubular, $v_r$ is the shear velocity through the formation, $\rho_2$ is the density of the tubular and $v_2$ is the shear velocity of the tubular.

* * * * *